United States Patent
Sexton et al.

(10) Patent No.: US 6,279,012 B1
(45) Date of Patent: Aug. 21, 2001

(54) REDUCING THE MEMORY FOOTPRINT OF A SESSION DURATION SEMISPACE

(75) Inventors: Harlan Sexton, Menlo Park, CA (US); Peter Benson, Boulder, UT (US); David Rosenberg, San Jose, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/172,095

(22) Filed: Oct. 13, 1998

(51) Int. Cl.[7] .................................................... G06F 12/00
(52) U.S. Cl. ................................................................ 707/206
(58) Field of Search ............................ 707/206; 711/132; 717/9

(56) References Cited

U.S. PATENT DOCUMENTS

| | | | | |
|---|---|---|---|---|
| 5,241,673 | * | 8/1993 | Schelvis | 707/1 |
| 5,692,185 | * | 11/1997 | Nilsen et al. | 707/104 |
| 5,873,105 | * | 2/1999 | Tremblay et al. | 707/206 |
| 6,105,040 | * | 8/2000 | Agesen | 707/206 |

OTHER PUBLICATIONS

Garbage collection software integrated with the system swaper in a virtual memory system, by Katzberg et al, WESCANEX"93 (IEEE publication), pp. 184–191, May 1993.*

\* cited by examiner

*Primary Examiner*—Thomas Black
*Assistant Examiner*—Diane D. Mizrahi
(74) *Attorney, Agent, or Firm*—Hickman Palermo Trong & Becker LLP; Marcel K. Bingham (57) ABSTRACT

A method and apparatus for performing copying garbage collection is provided. In a computer's memory, objects are stored in a permanent semispace. When a garbage collection event is detected, a garbage collection cycle is commenced. During the garbage collection cycle, the live objects in the permanent semispace are copied into a temporary semispace. After copying all the live objects into the temporary semispace, the live objects are then recopied into the permanent semispace.

18 Claims, 9 Drawing Sheets

REDUCING THE MEMORY FOOTPRINT OF A SESSION DURATION SEMISPACE

FIELD OF THE INVENTION

The present invention relates to the garbage collection of objects.

BACKGROUND OF THE INVENTION

Many computer systems provide for dynamic allocation of data objects. The performance of these systems relies on the ability to reclaim and re-use memory that has been dynamically allocated to objects after the objects are no longer being used by an executing program. In practice, an object is considered unused when no reference on a computer system refers to the object. When no reference refers to an object, the object is referred to as "dead". Garbage collection refers to the process of automatically reclaiming memory that is currently allocated to dead objects.

Garbage collection may be performed in cycles referred to as garbage collection cycles. During a garbage collection cycle, a set of operations are performed to identify the dead and live objects within a memory area at a particular point in time, and to reclaim memory allocated to the identified dead objects. Typically, during a garbage collection cycle, the objects that reside in the memory that is undergoing garbage collection may not be accessed by user processes (processes that are not involved in the garbage collection operation).

A garbage collection cycle is commenced when a garbage collection event is detected. Garbage collection events include, for example, an "insufficient memory" response during an attempt to allocate memory for a new object. A garbage collection event may simply be the lapse of a threshold period of time, thus causing garbage collection to be performed on a periodic basis.

One conventional method of garbage collection is known as the "tracing" approach. According to the tracing approach, a "trace" is performed during each garbage collection cycle. A trace is an operation performed to identify objects that are not dead (i.e. "live" objects). During a trace, live objects are identified by following direct and indirect references that exist in one or more areas of memory. An area of memory that contains references which directly or indirectly refer to live objects is referred to as a "root set". A base set is a set of root sets that are traced by a garbage collector to find all the live objects in the area of memory being managed by the garbage collector.

Any object not identified through a trace of the root sets in the base set is considered dead, and memory allocated to the object may be reclaimed. For example, assume that a call stack S is the only root set in the base set for a garbage collector that manages memory A. Assume also that object A, object B, and object C reside in memory A. A reference from call stack S refers to object A, and a reference within object A refers to object B. Object A is thus directly referenced by the reference in call stack S, and object B is indirectly referenced by the reference in call stack S. A trace through the call stack therefore identifies object A and object B, but not object C. Object C is therefore dead, and memory allocated to object C may be reclaimed.

The tracing approach poses several problems for computer systems that use large amounts of memory to store objects. Because execution of processes running on the computer system (e.g. real-time applications) are paused during garbage collection, and a trace accesses all the active objects, long delays in the execution of the processes may occur. Furthermore, accessing all the objects on a computer system violates the presumption of locality of reference that underlies virtual memory operating systems, and may result in excessive memory page thrashing.

One common approach used in conjunction with the tracing approach is the copying approach. Under the conventional "copying" approach, an area of memory is divided into semispaces. A semispace is an area of memory used to store objects which are garbage collected using the copying approach. One semispace is designated as the "to-space", and one is designated as the "from-space". Live objects are stored in the from-space, and newly created objects are allocated memory from the from-space.

During a garbage collection cycle, live objects identified through a trace are copied into the to-space. An object is copied into the to-space beginning at the memory location that immediately follows the memory area into which the previously copied object was copied. Because most objects in the from-space are dead (due to the short life span of the objects), the total memory allocated to the objects copied to the to-space from the from-space is typically much smaller than the amount that was allocated to all objects in the from-space. The difference represents reclaimed memory.

Because the moved objects now reside at new storage locations, all references referring to any object that was copied must be reset to refer to the new location of the copied object. Finally, the to-space is established as the current from-space, and the former from-space becomes the current to-space. New objects are allocated memory from the unoccupied portion of the current from-space (the semispace to which live objects have just been copied).

One advantage of the copying approach is that live objects are compacted into one end of the to-space, thereby reducing fragmentation. Another advantage is that the objects most likely to have longer life spans, i.e. the set of objects that are alive at the end of a garbage collection cycle, are clustered into fewer pages of memory. This results in greater data locality.

A disadvantage of the copying approach is that memory utilization is inefficient. Because the memory area managed by the garbage collector is divided into two semispaces, only one of which is used to store live objects, the greatest memory utilization that may be achieved is 50%. This inefficiency becomes more problematic for memory areas that are concurrently shared by a relatively greater number of processes.

Figure 1:
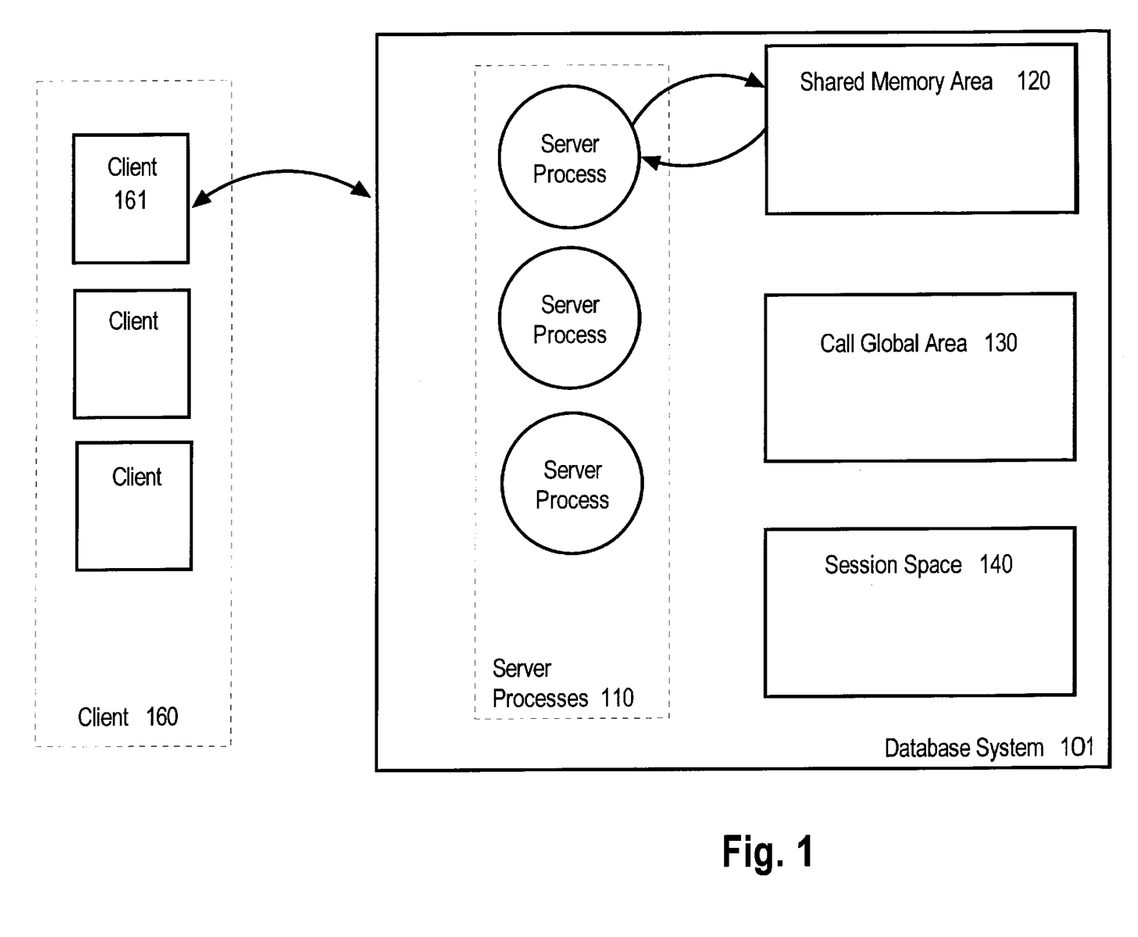
FIG. 1 is an exemplary database system upon which an embodiment of the present invention may implemented.

FIG. 1, for example, shows a database system 101, which is used to illustrate problems associated with the conventional copying approach on computer systems with memory areas that are concurrently shared by a relatively large number of processes. Referring to FIG. 1, database system 101 receives calls from one or more clients 160. A call is a request to perform a task. A call may be, for example, a query in the form of an SQL statement, or a method invocation of a Java™ object or class residing on database system 101.

Before client 161 issues any calls to database server 101, a database session must be created for client 161. A database session is the establishment of a particular connection between a client and a database system through which a series a calls may be made. While the client remains connected in the database session, the client and the database session are referred to as being active.

When client 161 calls database server 101, one of server processes 110 is assigned to execute the call. At any given moment of time, a server process is assigned to execute the call of no more than one client. However, after a server process completes its execution of a call from one client, the server process may be assigned to respond to the call of another client. Thus, over a period of time, a server process may be assigned to execute the calls of multiple clients.

The number of calls requiring execution by a server process is typically less than the current number of active clients. Thus, database system 101 is typically configured to run less server processes than the maximum number of clients who may be active.

Database system 101 includes various memory areas used to store data used by server processes 110. These include call shared memory area 120, call global area 130, and session space 140. A shared memory area, such as shared memory area 120, is used to store data that may be shared concurrently by more than one process. For example, shared memory area may be used store the code for routines (e.g. byte code of Java classes) executed by multiple server processes 110.

A call global area, such as call global area 130, is used to store data that is bounded by the lifetime of a call. An example of such data is provided by the illustration that follows. Client 161 calls database system 101 to execute a first method of a first object. The invocation of the first method creates a first set of objects, and causes the invocation of a second method, which creates a second set of objects. After exiting the second and first invocation, the first and second set of objects are no longer alive (i.e. referenced). Objects, such as the first and second set of objects, that are only alive for the lifetime of a call may be stored in the call global area 130.

A session space, such as session space 140, is used to store static data. Static data, as used herein, refers to data associated with a user which is preserved for the duration of a series of calls. For example, static data includes data that is preserved between calls issued by a client during a single database session. Java class variables are an example of such static data.

The percentage of a memory area that can actually be used to store data largely depends on the memory management technique used to manage the memory area. The percentage of a memory area that can actually be used to store data is referred to as the "memory utilization rate". For example, at any given time, only 50% of a memory area managed using the "copying" garbage collection approach can be used to store live objects. The other 50% must be available for use as the "to-space" in the next garbage collection cycle. Thus, a memory area managed using the copying garbage collection approach has a memory utilization rate of 50%.

The memory utilization rates associated with the various memory areas used within a computer system have an effect on various operating characteristics of the system. For example, the maximum number of database sessions that can be concurrently active on database system 101 is affected by the memory utilization rate of session space 140, as illustrated in the following example.

Session Space: For purpose of explanation, the size of session space 140 is 1 megabyte ("mb"). A database session on average requires 10 kilobytes ("kb") of session space 140. In order to preserve objects between the calls for a given database session, on average 10 kb of session space 140 is exclusively apportioned to each active database session. If the memory utilization rate of session space 140 is 80%, then there may be a maximum of 80 concurrent active database sessions (1 mb/10 kb*0.8). If, however, the memory utilization rate of session space 140 is 50% (the best that can be achieved under the copying approach), then the maximum number of concurrent sessions is 50.

Call Global Area: As mentioned above, the lifetime of objects in call global area 130 is bounded by a call, while the lifetime of objects in session space 140 is bounded by a series of calls. The lifetime of objects stored in a memory area affects the impact of memory utilization for that memory area upon scalability, as illustrated in the following example.

For purposes of exposition, the size of call global area 130 is 1 mb. On average 10 kb of call global area 130 is apportioned to service a particular call for a database session. Because memory is only needed for the lifetime of the call, the apportionment lasts only for the duration of the call.

At any given moment, 25% of the database sessions have active calls that are being serviced. If the memory utilization rate is 80%, then there may be a maximum of 320 concurrent sessions (1 mb/0.25*10 kb *0.8). If, however, the memory utilization rate is 50%, then the maximum number of concurrent sessions is 200.

Shared Memory Area: Unlike session space 140, objects in shared memory area 120 may be shared concurrently by multiple clients. The number of database sessions that concurrently share data (i.e. one or more objects) stored in an area of shared memory area affects the impact of memory utilization of that shared memory area upon scalability.

For purposes of exposition, shared memory area 120 is 1 mb. On average two sessions concurrently share 10 kb portion of shared memory area 120. If the memory utilization rate is 80%, then there may be a maximum of 160 concurrent active sessions (1 mb/10 kb*0.8*2). If, however, the memory utilization rate is 50%, then the maximum number of concurrent active clients is 100.

As demonstrated above, in comparison to the call global area and shared memory area, reduced memory utilization of the session space costs more in terms of user scalability. It is therefore desirable to provide a "copying" garbage collection method with greater memory utilization, especially for memory areas where reduced memory utilization rates are more costly.

SUMMARY OF THE INVENTION

A method and apparatus for performing copying garbage collection is described. According to an aspect of the present invention, objects are stored in a permanent semispace. When a garbage collection event is detected, a garbage collection cycle is commenced. During the garbage collection cycle, the live objects in the permanent semispace are copied into a temporary semispace. After copying all the live objects into the temporary semispace, the live objects are then recopied into the permanent semispace. The use of temporary semispace reduces the amount of memory required for storing objects between garbage collection cycles by 50%. In an embodiment of the present invention, the temporary semispace is allocated from a global call area and the permanent semispace is allocated from session space, reducing the amount of session space needed to store objects by 50%, and increasing the number of database sessions that may be concurrently active.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for performing copying garbage collection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Conventional copying garbage collection involves copying live objects from a first semispace to a second semispace within one garbage collection cycle. According to an aspect of the present invention, the live objects are copied back to the first semispace before the garbage collection cycle ends. After the garbage collection cycle ends, user processes may access the objects.

The semispace where the live objects reside before and after the garbage collection cycle is referred to herein as the "permanent" semispace. The permanent semispace may be allocated from more expensive memory, such as session space or other shared memory. The semispace where live objects are collected and temporarily stored during a garbage collection is referred to herein as the "temporary" semispace. The live objects are copied back to the permanent semispace before the end of the garbage collection cycle. The temporary semispace may be allocated from less expensive memory, such as the global call area. After copying back all the live objects, the temporary semispace may be relinquished for purposes other than garbage collection.

The present invention offers a variety of advantages over conventional methods of copying garbage collection. First, because temporary semispaces may be relinquished at the end of the garbage collection, overall memory utilization is improved. Second, the temporary semispace may be allocated from memory areas where poorer memory utilization is less expensive (e.g. a global call area).

Figure 2:
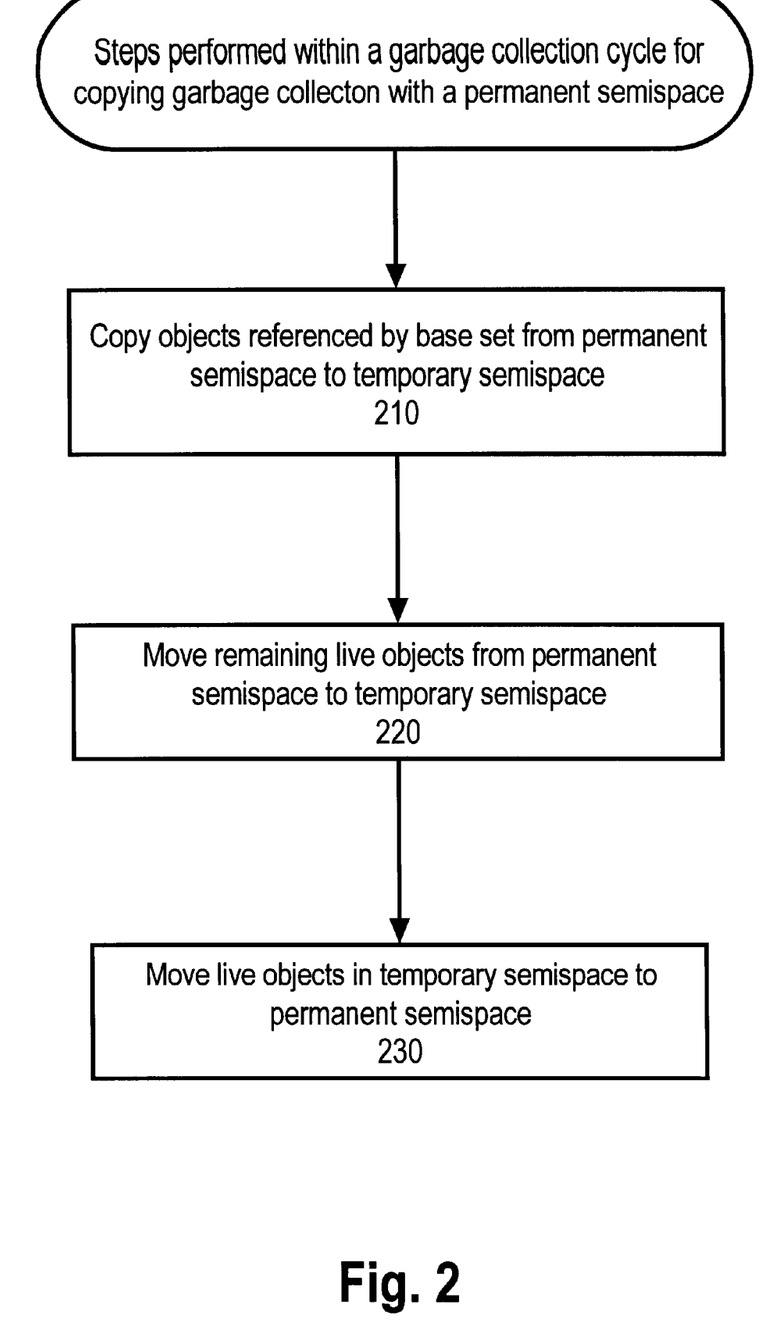
FIG. 2 is a flow chart depicting at a high level a technique for performing garbage collection according to an embodiment of the present invention.

FIG. 2 is a high level flowchart showing a technique for copying garbage collection of objects using a permanent semispace and a temporary semispace according to an embodiment of the present invention. The steps are executed during a garbage collection cycle. If memory for the temporary semispace has not yet been allocated, then before the commencement of the steps in FIG. 2, memory must be allocated to the temporary semispace. Before the garbage collection cycle ends, the memory used by the temporary semispace is deallocated (unless it is to remain allocated between garbage collection cycles).

Referring to FIG. 2, at step 210 objects directly referenced from a base set are copied from a permanent semispace to the temporary semispace. A step 220, the remaining live objects indirectly referenced by the base set are moved to the temporary semispace. At step 230, the live objects in the temporary semispace are copied back into the permanent semispace. In some embodiments of the present invention, steps 210 and 220 may be intermingled before the live objects are copied back into the permanent semispace.

Exemplary Memory Areas and Base Set

Figure 3:
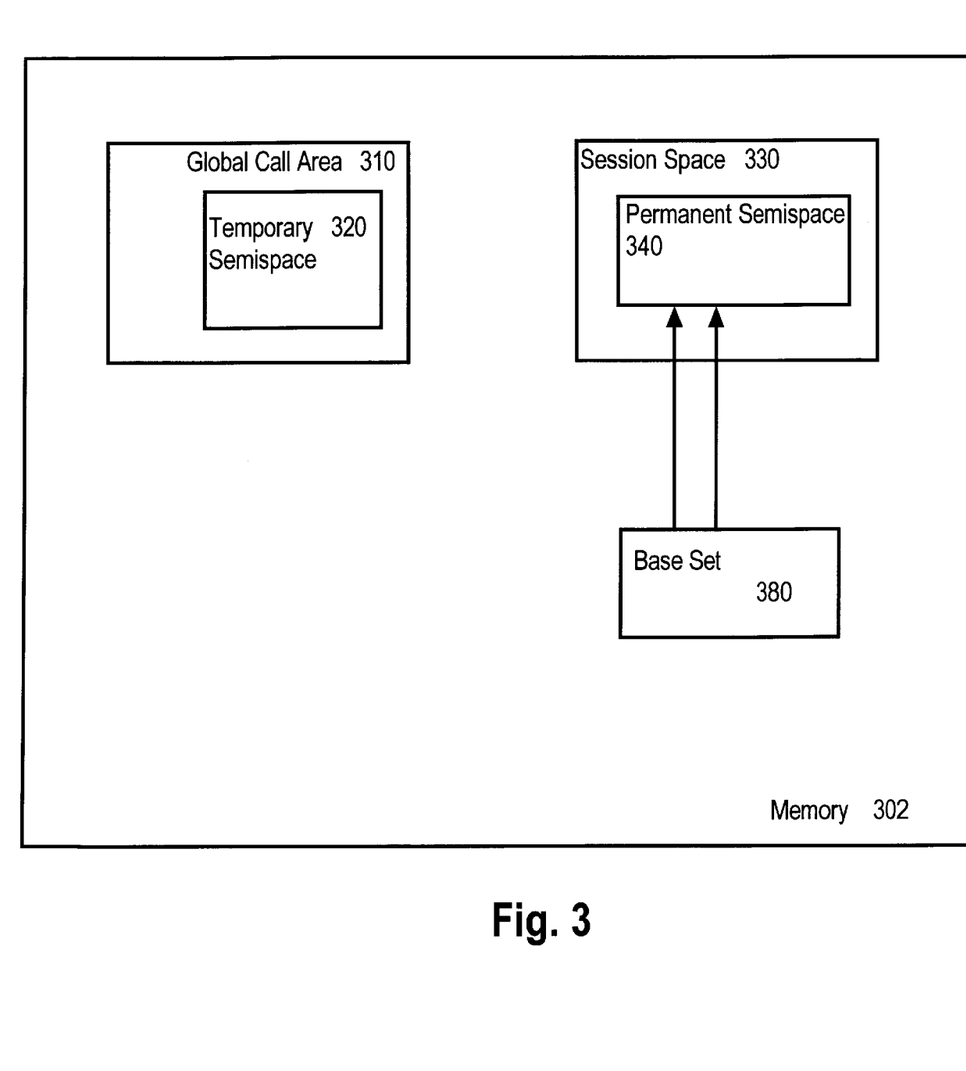
FIG. 3 is a block diagram depicting memory used to store objects managed that are garbage collected according to an embodiment of the present invention.

FIG. 3 shows exemplary memory areas used for storing objects according to an embodiment of the present invention. Memory 302 includes global call area 310 and session space 330. Global call area 310 includes temporary semispace 320. Session space 330 includes permanent semispace 340. Base set 380 contains references to objects stored in permanent semispace 340. Base set 380 includes, for example, a Java™ runtime stack and a PL/SQL runtime stack. A PL/SQL runtime stack is generated by a database system executing PL/SQL code. PL/SQL is a database language available from Oracle Corporation.

According to an embodiment of the present invention, base set 380 contains several kinds of references to objects stored in permanent semispace 340. One type of reference is a relative pointer. A relative pointer contains a relative address to an object stored in a permanent semispace 340. A relative address is added to a base memory address to determine the memory address of the referenced object. Another type of reference is a logical pointer. A logical pointer indicates the location of an object within a semispace. A data structure containing an integer value is an example of a logical reference. For example, the integer may indicate the number of bytes between the beginning boundary of the permanent semispace 340 and the beginning boundary of the referenced object. Alternatively, the integer may represent the number of N byte chunks between the beginning boundary of the permanent semispace 340 and the beginning boundary of the referenced object.

A compound field is another example of a logical reference, where the compound field includes a page number and a page offset. The page offset represents the number of bytes between the beginning boundary of a page in a semispace and the beginning boundary of the referenced object.

Figure 4A:
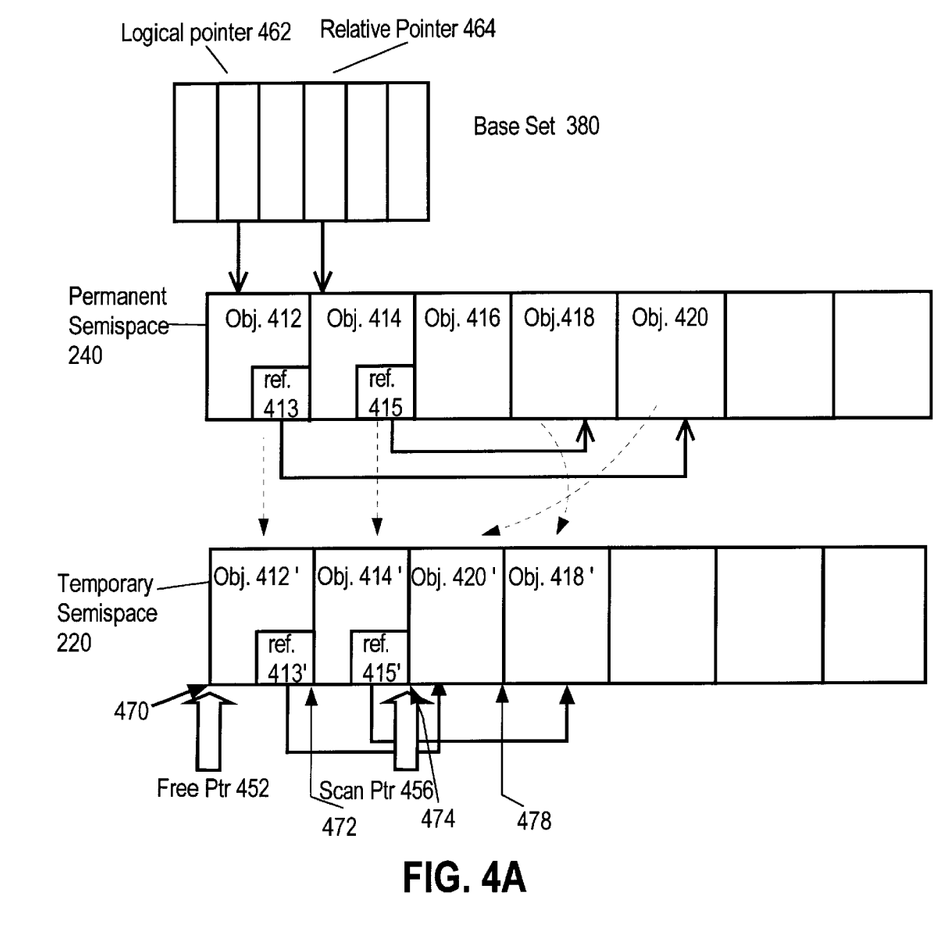
FIG. 4A is a block diagram depicting objects, a base set with references to the objects, and other data structures used to illustrate an embodiment of the present invention.

FIG. 4A shows in greater detail permanent semispace 340, temporary semispace 320, base set 380, and objects stored in permanent semispace 340. Permanent semispace 340 includes objects 412, 414, 416, 418, and 420. Object 412 has reference 413, which refers to object 420. Object 414 has a reference 415, which refers to object 418. According to an embodiment of the present invention, reference 413 and reference 415 are logical pointers.

The base set 380 includes logical pointer 462 and relative pointer 464. Logical pointer 462 refers to object 412. Relative pointer 464 refers to object 414.

Free pointer 452 and scan pointer 456 are pointers used to manage the movement of objects between a permanent semispace and a temporary semispace. Free pointer 452 points to a memory location representing a memory address to which an object may be copied within temporary semispace 320. Scan pointer 456 is used to track, within the objects moved to the temporary semispace, which references are currently being used to trace live objects.

FIG. 4A also depicts the movement of objects between the permanent semispace 340 and temporary semispace 320 according to an illustration of the techniques described herein for copying garbage collection. For example, object 412' represents object 412 after it is copied to temporary semispace 320.

Figure 4B:
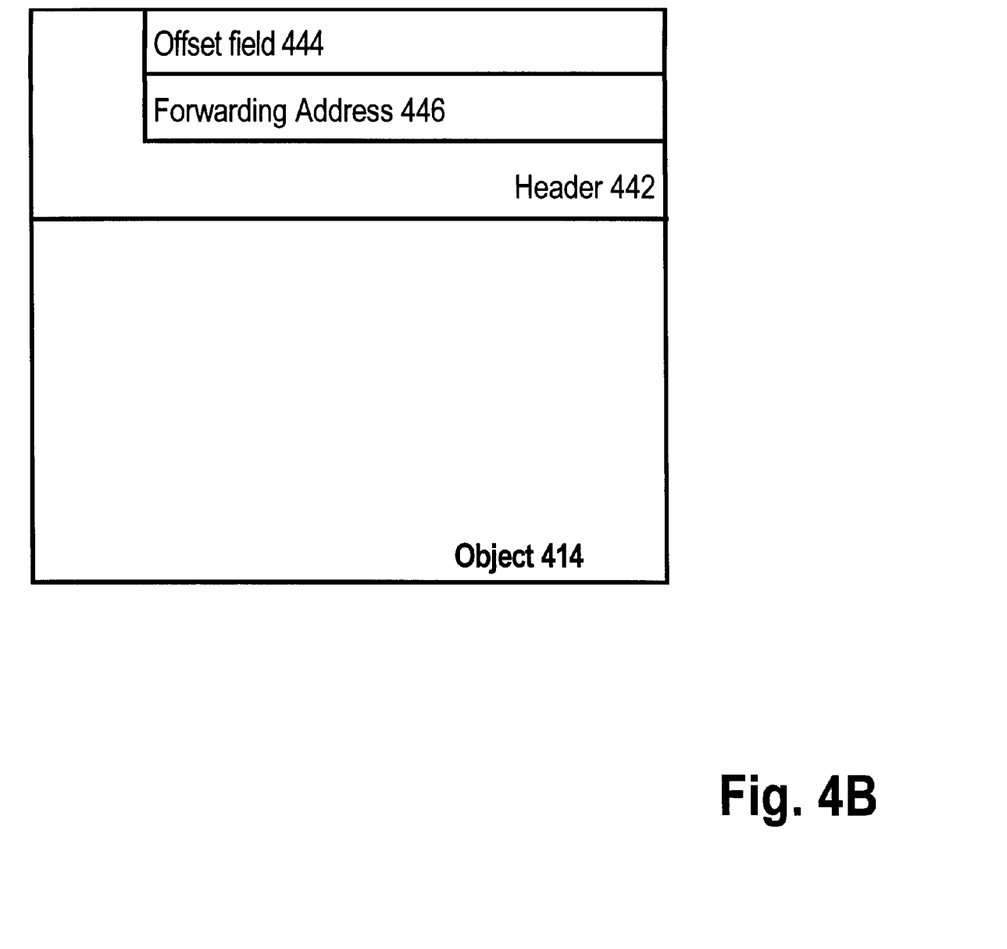
FIG. 4B is a block diagram depicting an exemplary object structure according to an embodiment of the present invention.

FIG. 4B shows object 414 in greater detail according to an embodiment of the present invention. Object 414, like other objects stored in permanent semispace 340, contains header 442. Header 442 includes data describing object 414. For purposes of exposition, header 442 is depicted as including offset field 444 and forwarding address field 446. Offset field 444 is an offset to the memory address of the ending boundary of object 414. Thus, when the beginning boundary of object 414 is known, offset field 444 also indicates the size of object 414.

Forwarding address field 446 is data that indicates the forwarding address of an object. The forwarding address of an object is a reference (e.g. logical pointer) to where a copy of the object resides in the temporary semispace. A forwarding address field will only contain data in an object that has been moved during garbage collection, and only in the copy of the object that is left in the permanent semispace during garbage collection.

While one object format as been described, those skilled in the art will recognize that the object format may vary. For example, the header may contain a flag indicating that that an object has been moved to a forwarding address, and the forwarding address may be written in the object body that follows the header. It is therefore understood that the present invention is not limited to any particular object format.

Moving Objects Between the Permanent Semispace and the Temporary Semispace

At various stages during a garbage collection cycle, objects are moved from the permanent semispace to the temporary semispace. FIG. 4 shows the steps that are performed to move an object from the permanent semispace to the temporary semispace according to an embodiment of the present invention.

To move an object from permanent semispace 340 to the temporary semispace 320, the object is copied into in the temporary semispace 320 at the memory address specified by free pointer 452. In the copy of the object that is left in permanent semispace 340, the forwarding address field 446 is set to refer to the object's location within temporary semispace 320. Next, free pointer 452 is set to the memory address in the permanent semispace just beyond the just copied object.

Figure 5:
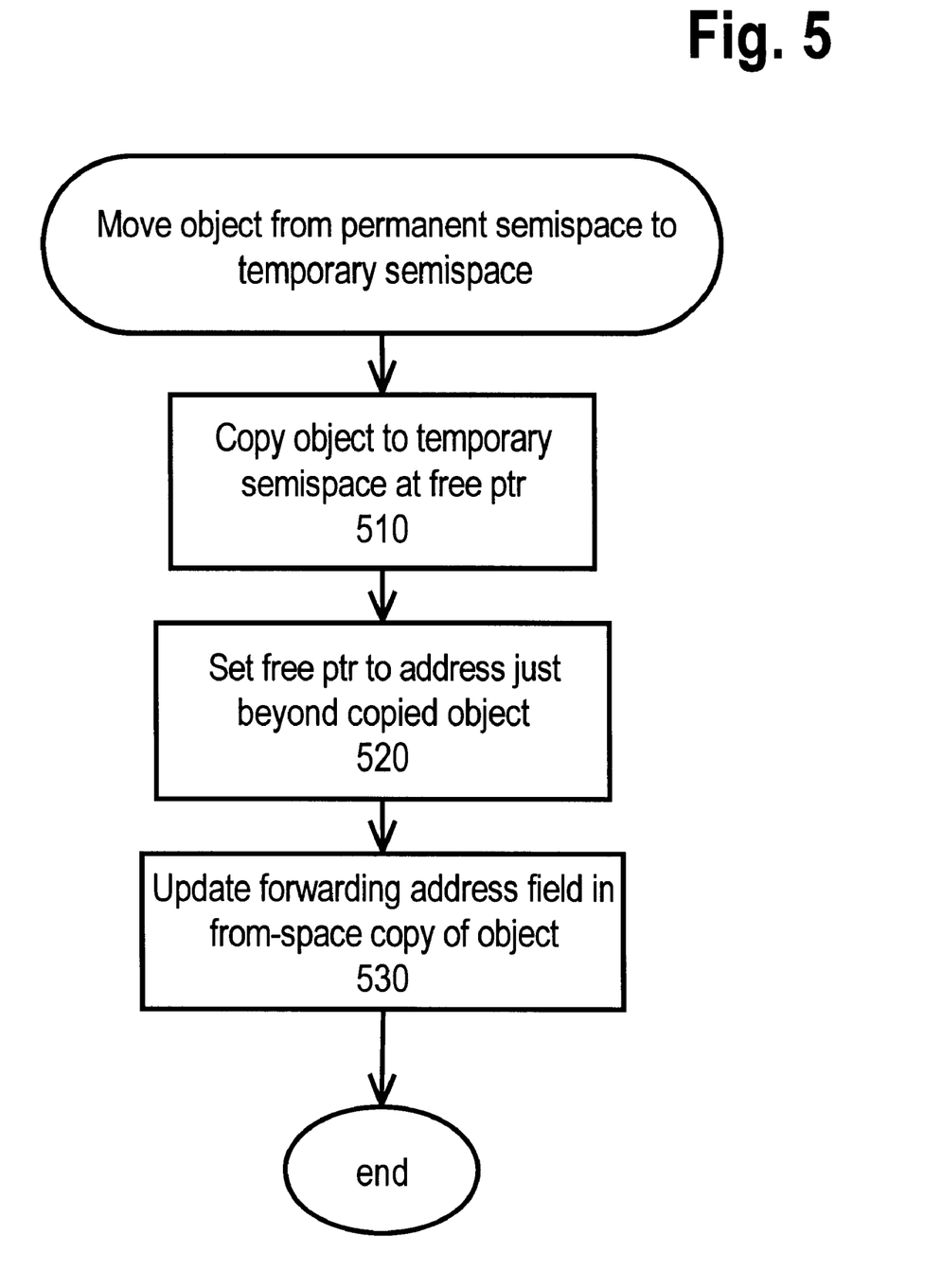
FIG. 5 is a flowchart showing steps for moving objects from a permanent semispace to a temporary semispace according to an embodiment of the present invention.

The steps of FIG. 5 are illustrated with reference to permanent semispace 340 and temporary semispace 320 as shown in FIG. 4A. For purposes of illustration, object 412 and object 414 have been moved. A copy of object 412, i.e. object 412', has been created in the temporary semispace 320. Likewise, a copy of object 414' has been created in temporary semispace 320. Free pointer 452 is pointing to memory address 474, the memory address just beyond the ending boundary of object 414'. Garbage collector 402 has determined that object 420 is to be moved, and is beginning to execute the steps shown in FIG. 5.

At step 510, a copy of the object is created in the temporary semispace 320 beginning at the memory address specified by the free pointer 452. In this example, a copy of object 420 is created as object 420' at the memory address 474 currently pointed to by free pointer 452. Control then flows to step 520.

At step 520, the free pointer 452 is incremented to the memory address just beyond the boundary of the just copied object. Control then flows to step 520. In this example, free pointer 452 is incremented to memory address 478. Control flows to step 530.

At step 530, the forwarding address field of the copy in the permanent semispace of the just moved object is updated. Execution of the steps for moving an object between boundaries then ceases. In this example, the forwarding address field in object 420 is updated to reflect memory address 474. The value of the forwarding address field may depend on the form of the logical pointer. For example, if the logical pointer is an integer value indicating the offset within the permanent semispace to the beginning of an object, then forwarding address field 446 is updated to this integer value.

Moving Objects Referenced By the Base Set

Figure 6:
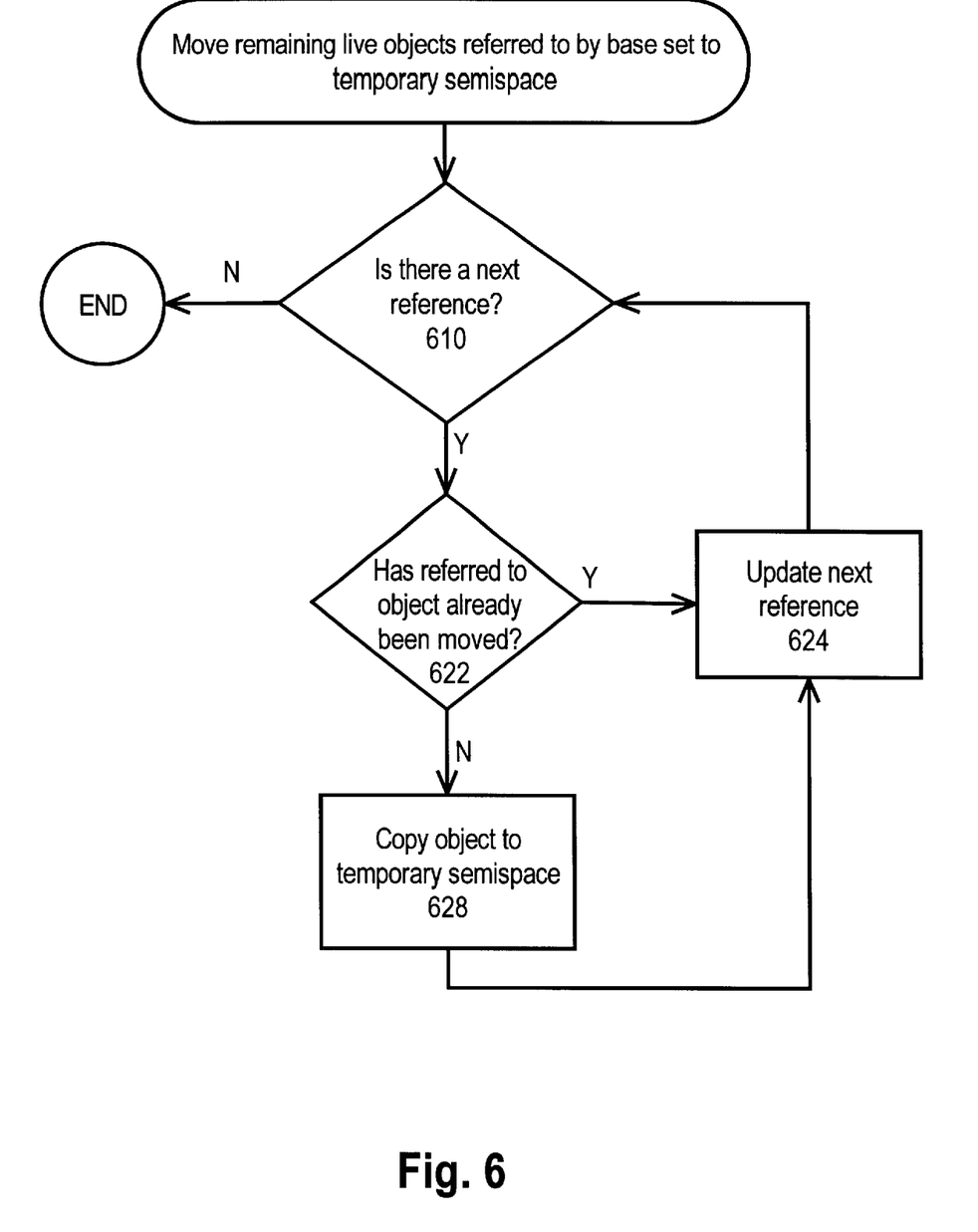
FIG. 6 is a flowchart showing steps for moving objects referenced by the base set according to an embodiment of the present invention.

FIG. 6 shows the steps for moving the objects referred to by references in the base set. Each referenced object is moved from the permanent semispace to the temporary semispace. The steps of FIG. 6 are illustrated using the structures shown in FIG. 4A.

At step 610, it is determined whether there is a next reference in the base set 380. If there is a next reference in the base set 380, control flows to step 622. Otherwise, execution of the steps ends. In this example, for purposes of illustration, the next reference is logical pointer 462, a reference that refers to object 412. Control thus flows to step 622.

At step 622, it is determined whether the object has already been moved to the temporary semispace. If the object has already been moved, control flows to step 624, where the next reference is updated to reflect the forwarding address of the object. Otherwise, control flows to step 628. In this example, there is no data in the forwarding address field of object 412. Therefore, the object has not been moved, and control flows to step 628.

At step 628, the object is moved. An object is moved by executing the steps shown in FIG. 5. In this example, for purposes of illustration, free pointer 452 points to memory address 470. Object 412 is copied to permanent semispace 340 beginning at memory address 470. Free pointer 452 is then incremented to the memory address 472, the memory address just after the ending boundary of object 412'. Control then flows to step 624.

At step 624, the next reference is patched, that is, updated to refer to the just created object copy in step 628. If the next reference is not a logical pointer, the next reference is converted to a logical pointer. Control then returns to step 610.

At step 610, it is determined that there is a next reference. For purposes of illustration, the next reference is relative pointer 464. Therefore, control flows to step 622. At step 622, it is determined that object 414 has not been moved because it does not have a forwarding address. Therefore, control flows to step 628. At step 628, object 414 is moved. Specifically, a copy of object 414 is created at memory address 474.

At step 624, the next reference is patched to refer to object 414. In this example, because the next reference is a relative pointer, it is converted to a logical pointer. Control flows to step 610.

At step 610, for purposes of illustration, it is determined that there is no next reference. Therefore, execution of the steps ceases. At this point, object 412 and object 414 have been moved to the temporary semispace 320.

Moving the Remaining Live Objects

Figure 7:
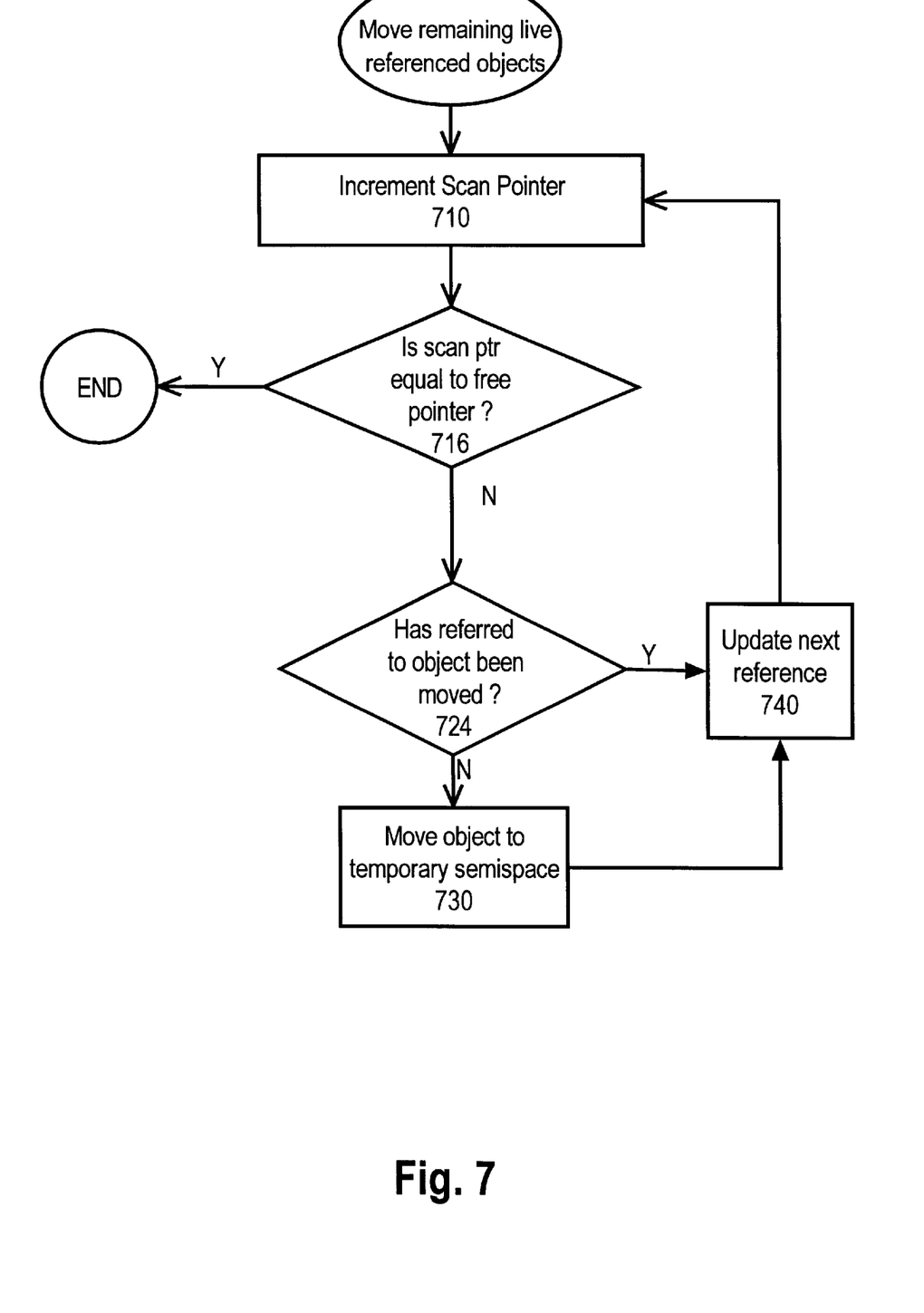
FIG. 7 is a flowchart showing steps for moving the live objects remaining in the permanent semispace according to an embodiment of the present invention.

FIG. 7 shows the steps for moving the remaining live objects. In the steps shown in FIG. 7, each object in the temporary semispace is scanned for references to other objects, beginning with the first object in the temporary semispace. If a referenced object has not already been moved to the temporary semispace, then the object is moved. If the referenced object has been moved, then the reference is updated to reflect the forwarding address.

Scan pointer 456 is maintained in a manner such that it points to the current reference being scanned. After examining the reference pointed to by scan pointer 456, scan pointer 456 is incremented to the next reference to scan. When scan pointer 456 equals free pointer 452, then every object in the temporary semispace 320 has been scanned, and every live object in permanent semispace 340 has been moved to temporary semispace 320.

The steps of FIG. 7 are illustrated using the structures shown in FIG. 4A. Initially, scan pointer 456 is set to memory address 470, the beginning boundary of the first object in the temporary semispace 320 (i.e. object 412'). Free pointer 452 is set to memory address 474.

At step 710, the scan pointer is incremented to the address of the next reference, or, if there is no next reference, to a value equal to free pointer 452. In this example, for purposes of illustration, the object 412' contains the next reference, which is reference 413' in object 412'. Reference 413' refers to object 420. Therefore, scan pointer 456 is incremented to point to reference 413'. Control then flows to step 716.

At step 716, it is determined whether or not the scan pointer 456 is equal to the free pointer 452. If scan pointer 452 is equal to free pointer 452, then control flows to step 724. Otherwise, execution of the steps shown in FIG. 7 ceases. In this example, scan pointer 456 does not equal the free pointer 452. Control thus flows to step 724.

At step 724, it is determined whether or not the next reference refers to a moved object. If the next reference does not refer to a moved object, then control flows to step 730, where the object is moved in accordance with the steps of FIG. 5. Otherwise, control flows to step 730, where the next reference is updated to reflect the object's forwarding address. In this example, the forwarding address field of object 420 does not contain any data, thus control flows to step 730.

At step 730, object 420 is moved in accordance with the steps shown in FIG. 5. The free pointer is moved to the memory address 478. Control then flows to step 740. At step 740, the next reference is patched. Control then flows to step 710.

At step 710, for purposes of illustration, the next reference is reference 415'. Reference 415' refers to object 418. At step 716, it is determined that scan pointer 456 is not equal to the free pointer 452. At step 724, it is determined that the next reference 415' does not refer to a moved object. Object 418 is moved in accordance with the steps shown in FIG. 5. At step 740, the reference 415' is patched.

Copying from the Temporary Semispace to the Permanent Semispace

After the live objects in permanent semispace 340 have been copied to temporary semispace 320, the live objects are then copied back to the permanent semispace 340. The objects are copied without rearranging their relative positions to each other or within the semispace that contains them. Thus, logical references to them remain valid. Straightforward copying functions, such as memcpy 0 available in the ANSI Standard C libraries, may be used. After copying to the permanent semispace, the garbage collection cycle ends, and the objects become accessible to other processes running on the system.

During garbage collection, the present invention does not require converting to a logical reference every reference that is not logical reference (i.e. all "nonlogical references"). Instead, nonlogical references and the objects to which they refer are tracked and patched without conversion to a logical reference. For example, while scanning the base set 380 for references to objects to move to temporary semispace 320, nonlogical references are identified and mapped to the object they refer to. When copying the object back to permanent semispace 340, nonlogical references mapped to the object are updated appropriately.

Hardware Overview

Figure 8:
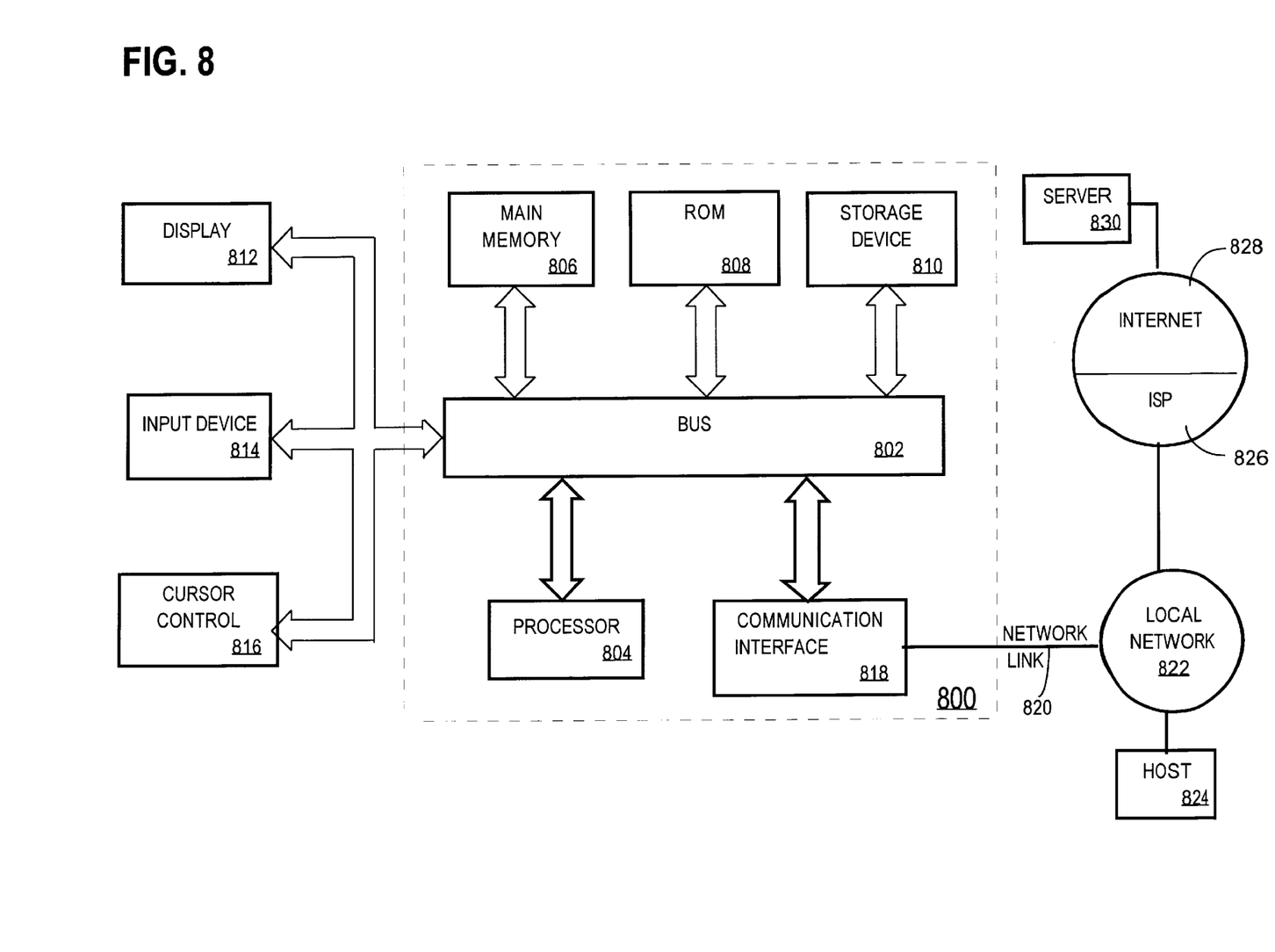
FIG. 8 is a block diagram depicting a computer system upon which an embodiment of the present invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer client. An input device 814, including alphanumeric and other keys, is coupled to bus 802 for communicating information and command selections to processor 804. Another type of client input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for copying garbage collection. According to one embodiment of the invention, copying garbage collection is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes Adynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for copying garbage collection as described herein.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing copying garbage collection, the method comprising the steps of:

detecting a garbage collection event; and in response to detecting said garbage collection event, performing the following steps in a single garbage collection cycle:

copying live objects that currently reside in a permanent semispace into a temporary semispace, and recopying said live objects from said temporary semispace to said permanent semispace.

2. The method of claim 1, wherein:

the method further includes the step of, in response to copying live objects that currently reside in said permanent semispace into a temporary semispace, modifying references in said live objects to each other to reflect new locations of said live objects; and the step of recopying includes recopying said live objects into said permanent semispace without modifying said references.

3. The method of claim 1, further comprising the step of establishing said permanent semispace in memory used to store data that is preserved between a series of one or more calls.

4. The method of claim 3, further comprising the step of establishing said temporary semispace in memory that is used to store data that is discarded after any call.

5. The method of claim 1, further comprising the step of establishing said permanent semispace in memory that is used to store data that is associated with a database session, and is preserved during said database session.

6. The method of claim 1, wherein the steps performed in said single garbage collection cycle include:
- allocating memory for said temporary semispace prior to copying said live objects; and
- deallocating said memory for said temporary semispace after recopying said live objects.

7. A computer-readable medium carrying one or more sequences of one or more instructions for performing copying garbage collection, the one or more sequences of one or more instructions including instructions which, when executed by one or more processors, cause the one or more processors to perform the steps of:
- detecting a garbage collection event; and
- in response to detecting said garbage collection event, performing the following steps in a single garbage collection cycle:
  - copying live objects that currently reside in a permanent semispace into a temporary semispace, and
  - recopying said live objects from said temporary semispace to said permanent semispace.

8. The computer-readable medium of claim 7, wherein:
- the computer-readable medium further includes sequences of instructions for performing the step of, in response to copying live objects that currently reside in said permanent semispace into a temporary semispace, modifying references in said live objects to each other to reflect new locations of said live objects; and
- the step of recopying includes recopying said live objects into said permanent semispace without modifying said references.

9. The computer-readable medium of claim 7, further comprising sequences of instructions for performing the step of establishing said permanent semispace in memory used to store data that is preserved between a series of one or more calls.

10. The computer-readable medium of claim 9, further comprising sequences of instructions for performing the step of establishing said temporary semispace in memory that is used to store data that is discarded after any call.

11. The computer-readable medium of claim 7, further comprising sequences of instructions for performing the step of establishing said permanent semispace in memory that is used to store data that is
- associated with a database session, and
- is preserved during said database session.

12. The computer-readable medium of claim 7, wherein the steps performed in said single garbage collection cycle include:
- allocating memory for said temporary semispace prior to copying said live objects; and
- deallocating said memory for said temporary semispace after recopying said live objects.

13. A computer system comprising:
- a processor;
- a memory coupled to said processor, wherein said memory includes a permanent semispace;
- said processor configured to detect a garbage collection event; and
- said processor configured to perform, in response to detecting said garbage collection event, the following steps in a single garbage collection cycle:
  - copying live objects that currently reside in said permanent semispace into a temporary semispace, and
  - recopying said live objects from said temporary semispace to said permanent semispace.

14. The computer system of claim 13, comprising:
- said processor configured to respond to copying live objects that currently reside in said permanent semispace into a temporary semispace by modifying references in said live objects to each other to reflect new locations of said live objects; and
- said processor configured to recopy said live objects into said permanent semispace without modifying said references.

15. The computer system of claim 13, comprising said processor configured to establish the permanent semispace in memory used to store data that is preserved between a series of one or more calls.

16. The computer system of claim 15, comprising said processor configured to establish said temporary semispace in memory that is used to store data that is discarded after any call.

17. The computer system of claim 13, comprising said processor configured to establish said permanent semispace in memory that is used to store data that is
- associated with a database session, and
- is preserved during said database session.

18. The method of claim 13, said processor configured to perform in said single garbage collection cycle the following steps:
- allocating memory for said temporary semispace prior to copying said live objects; and
- deallocating said memory for said temporary semispace after recopying said live objects.

* * * * *